US012617920B2

(12) United States Patent
Serajian et al.

(10) Patent No.: US 12,617,920 B2
(45) Date of Patent: May 5, 2026

(54) POLYURETHANE FOAMS RECYCLING METHODS AND SYSTEMS

(71) Applicants: Edge Global Innovation Inc., Clearwater, FL (US); Vahid Serajian, Cypress, TX (US); Sahand Serajian, Lincoln, NE (US)

(72) Inventors: Vahid Serajian, Cypress, TX (US); Sahand Serajian, Lincoln, NE (US)

(73) Assignee: Edge Global Innovation Inc., Clearwater, FL (US)

(*) Notice: Subject to any disclaimer, the term of this patent is extended or adjusted under 35 U.S.C. 154(b) by 196 days.

(21) Appl. No.: 17/908,057

(22) PCT Filed: Aug. 19, 2022

(86) PCT No.: PCT/US2022/040888
§ 371 (c)(1),
(2) Date: Feb. 23, 2023

(87) PCT Pub. No.: WO2023/023325
PCT Pub. Date: Feb. 23, 2023

(65) Prior Publication Data
US 2024/0209175 A1      Jun. 27, 2024

Related U.S. Application Data

(60) Provisional application No. 63/235,194, filed on Aug. 20, 2021.

(51) Int. Cl.
C08J 11/12          (2006.01)
(52) U.S. Cl.
CPC ............ C08J 11/12 (2013.01); *C08J 2375/04* (2013.01)
(58) Field of Classification Search
USPC ......................................... 521/41
See application file for complete search history.

(56) References Cited

U.S. PATENT DOCUMENTS

| | | | |
|---|---|---|---|
| 3,935,132 | A | 1/1976 | Gerkin et al. |
| 5,908,894 | A | 6/1999 | Genz |
| 10,822,467 | B2 | 11/2020 | Yue et al. |
| 2008/0132591 | A1 | 6/2008 | Lawrence |
| 2016/0347927 | A1 | 12/2016 | Taheri et al. |
| 2020/0157306 | A1 | 5/2020 | Kumar et al. |
| 2020/0339735 | A1* | 10/2020 | Jaehnigen ............ A43B 7/1425 |
| 2020/0406550 | A1 | 12/2020 | Zhang et al. |
| 2021/0017326 | A1 | 1/2021 | Prissok |
| 2021/0054160 | A1 | 2/2021 | Yue et al. |
| 2022/0267562 | A1 | 8/2022 | Fortman et al. |

FOREIGN PATENT DOCUMENTS

| | | | |
|---|---|---|---|
| JP | S57 45026 A | | 3/1982 |
| JP | 2008013699 A | * | 1/2008 |
| WO | 2012065291 A1 | | 5/2012 |
| WO | 2017/204778 A1 | | 11/2017 |
| WO | 2020219663 A1 | | 10/2020 |

OTHER PUBLICATIONS

JP-2008013699-A Machine Translation (Year: 2008).*
CA-2045901-A1 Machine Translation (Year: 1992).*
Search Report issued for European Patent Application No. EP 22 85 9219 dated Jul. 16, 2025.
International Search Report for PCT/US2022/040888.

* cited by examiner

*Primary Examiner* — Terressa Boykin
(74) *Attorney, Agent, or Firm* — Thomas Joseph; OGC Law, LLC

(57)          ABSTRACT

A polyurethane foam product is formed into a plurality of polyurethane masses. The plurality of polyurethane masses are fed into an extruder with a thermoplastic polymer urethane thermoplastic elastomer. The plurality of polyurethane masses are blended with the thermoplastic polymer urethane thermoplastic elastomer at an elevated temperature to produce a recycled polyurethane product. The weight ratio of the plurality of polyurethane masses to the thermoplastic polymer urethane thermoplastic elastomer exceeds about 50:50.

20 Claims, 4 Drawing Sheets

200

FORM SMALLER POLYURETHANE MASSES FROM A POLYURETHANE FOAM PRODUCT — 201

FEED THE POLYURETHANE MASSES AND TPU INTO AN EXTRUDER — 202

BLEND THE POLYURETHANE MASSES WITH THE TPU AT AN ELEVATED TEMPERATURE — 203

SHAPE THE MIXTURE INTO A PRODUCT — 204

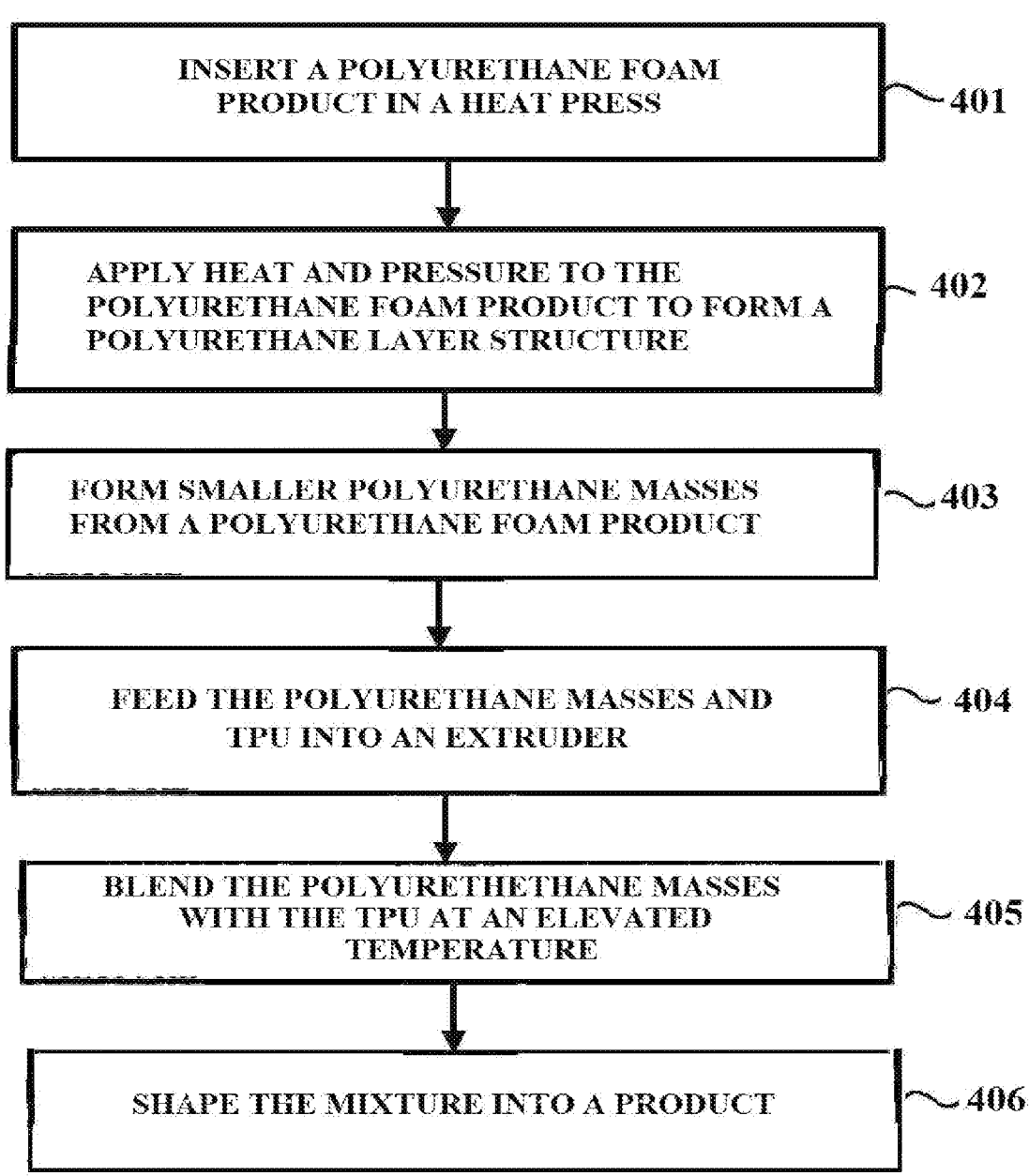

400

INSERT A POLYURETHANE FOAM PRODUCT IN A HEAT PRESS — 401

APPLY HEAT AND PRESSURE TO THE POLYURETHANE FOAM PRODUCT TO FORM A POLYURETHANE LAYER STRUCTURE — 402

FORM SMALLER POLYURETHANE MASSES FROM A POLYURETHANE FOAM PRODUCT — 403

FEED THE POLYURETHANE MASSES AND TPU INTO AN EXTRUDER — 404

BLEND THE POLYURETHETHANE MASSES WITH THE TPU AT AN ELEVATED TEMPERATURE — 405

SHAPE THE MIXTURE INTO A PRODUCT — 406

FIG. 4

POLYURETHANE FOAMS RECYCLING METHODS AND SYSTEMS

CROSS REFERENCE TO RELATED APPLICATIONS

The present application is a U.S. national stage application of PCT International Application No. PCT/US22/40888, filed Aug. 19, 2022, which claims priority to U.S. Patent Application No. 63/235,194, filed on Aug. 20, 2021. The disclosures of all the foregoing applications are hereby incorporated by reference in their entirety into the present application.

TECHNICAL FIELD

The subject disclosure is directed to systems, methods, and apparatus for recycling polyurethane materials and, more particularly, methods and systems for recycling and reusing post-industrial and post-consumer or scrap polyurethane foams, especially polyurethane foam mattresses.

BACKGROUND ART

Thermosets are covalently cross-linked networks that, unlike thermoplastics cannot be reprocessed by melting or dissolution in any solvents. These networks can exhibit a glass transition temperature (Tg) lower than the designed application service temperature (elastomer/rubber) or higher than the service temperature (thermoset resins). Thermoset rubbers find applications in the automotive industry (interiors, bumpers), biomedical devices, bedding, furniture, packaging, gaskets, O-rings and so on.

Usually, thermoset resins exhibit significant benefits in comparison with thermoplastics exhibiting dimensional stability, high mechanical properties, high thermal/creep/and chemical resistance, durability. This class of polymers maintain their structural strength, thermal and electrical resistance characteristics during prolonged use.

Thermosets find many industrial uses as coatings, adhesives, and other applications. Commercial applications include applications in energy production, manufacturing of light vehicles, structural materials for buildings, pipelines, industrial equipment and/or their components for instance heat exchangers, light-emitting diode lenses, flywheels for electricity grid stability, containers, or off-shore structures in which composite materials are the material of choice.

Polyurethanes, specifically polyurethane foams such as mattress and cushions represent a particular class of thermoset materials that present significant challenges with respect to recycling and/or to re-use of post-consumer or scrap materials. Such foams are partially landfilled or incinerated for energy recovery. A small portion of such foam is used for carpeting.

Some methods, such as chemical recycling, utilize catalysts and solvent swelling methods to recycle thermoset polyurethane waste and scrap. Such methods involve reversible reactions (transesterification and carbamate exchange) and depolymerization of polyurethane. Unfortunately, the use of catalysts and solvents to reprocess the thermoset can increase the complexity and the cost of the recycling process.

Other methods utilize thermal reprocessing of polyurethane foams by impregnating the materials with catalyst through solvent swelling or direct mixing. The catalyst is necessary to facilitate the reversible carbamate exchange reactions. The resultant mechanical properties were poor.

Accordingly, there is a need for method and system to reuse and to reprocess post-consumer or scrap polyurethane thermoset foams that is solvent free with acceptable mechanical properties than can be used in various consumer applications.

DISCLOSURE OF INVENTION

In various implementations, a method for recycling a polyurethane foam product is provided. The polyurethane foam product is formed into a plurality of polyurethane masses. The plurality of polyurethane masses are fed into an extruder with a thermoplastic polymer urethane thermoplastic elastomer. The plurality of polyurethane masses are blended with the thermoplastic polymer urethane thermoplastic elastomer at an elevated temperature to produce a recycled polyurethane product. The weight ratio of the plurality of polyurethane masses to the thermoplastic polymer urethane thermoplastic elastomer exceeds about 25:75. The elevated temperature is at least about 180° C.

BRIEF DESCRIPTION OF THE DRAWINGS

FIG. 4 is another exemplary process in accordance with this disclosure.

MODES FOR CARRYING OUT THE INVENTION

Figure 1:
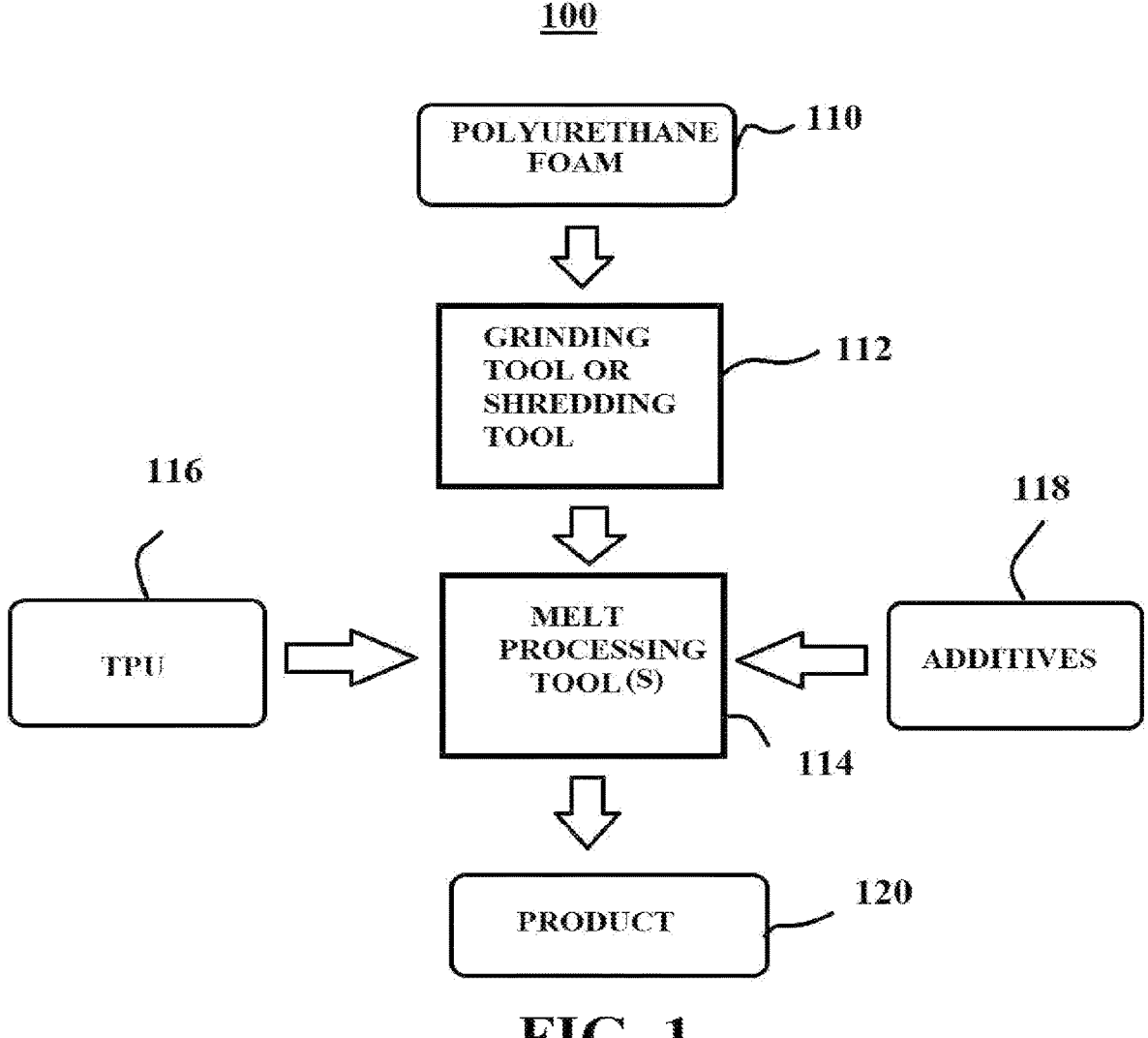
FIG. 1 is a schematic diagram of a system in accordance with this disclosure.

The subject disclosure is directed to methods and systems for recycling polyurethane materials and, more particularly, methods and systems for recycling and reusing post-industrial and post-consumer or scrap polyurethane foams, especially polyurethane foam mattresses.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation, or example can include a particular feature, structure or characteristic, but every embodiment, implementation or example can not necessarily include the particular feature, structure or characteristic. Moreover, such phrases are not necessarily referring to the same embodiment, implementation, or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

The subject disclosure is directed to methods and to systems for re-using and reprocessing post-consumer or post-industrial scrap polyurethane thermoset materials and, in particular, polyurethane foams. The polyurethane thermoset can include rigid and flexible foams, varnishes and coatings, adhesives, electrical potting compounds, and fibers such as spandex and polyurethane laminate (PUL), as foams comprise one of the largest segments of polyurethane use. The polyurethane foams include methylene diphenyl diisocyanate (MDI) based foams or toluene diisocyanate based (TDI) and/or a mixture of MDI and TDI based foams. The polyurethane foam also include foams based on 1,6 hexamethylene diisocyanate or HDI, 1,5 pentamethylene diisocyante or PDI, 4,4 methylenebis(cyclohexyl isocyanate or H12MDI, toluene-2,4 diisocyanate or TDI, Isophorone diisocyanate or IPDI, 4,4 methylene diphenyl diisocyanate or MDI, 1,4 phenylene diisocyanate or PPDI or combination thereof.

The disclosed technology provides for scalable, solvent free reprocessing methods that minimize the environmental impact of the recycling process without adding catalysts, thereto.

The disclosed technology can include a method for recycling a polyurethane foam by shredding the foam to form shredded polyurethane product in the form of pieces, particles, or powder. The shreds or particles of foam are fed into a melt polymer processing tool alone or with a suitable thermoplastic polymer urethane (TPU) thermoplastic elastomer compound for blending. The melt polymer processing tool produce an article of manufacture from the pieces or powder and the TPU compound. In other embodiments, the masses can be in the form of particles or sheet flakes.

The disclosed technology can include a system for recycling a polyurethane foam by shredding the polyurethane foam (as whole or pieces) and by densifying the shredded polyurethane foam under compression heat to form compressed sheet. The foam can be subject to predetermined heat, pressure, and compression times that are sufficient to produce a reversible and exchange vitrimerization reaction to transform the foam into sheet. The produced sheet can be ground into small flakes to feed into melt processing tool alone or with the suitable TPU compound.

The disclosed technology can include a system for recycling a polyurethane foam by subjecting the polyurethane foam (as whole or shredded) to heat, pressure and if necessary, shear to form sheet or any profile. The foam can be subject to predetermined heat, pressure, and compression times that are sufficient to produce a reversible and exchange reaction to transform the foam into sheet. The produced sheet or profile can be ground into small pieces or used as whole product for any other processes including (but not limited to) chemical or enzymatic recycling, or pyrolysis.

Compression can be provided by a compression molding tool that can be combination of any of stationary system in the form of two opposing pressing plates or of a continuous system in the form of series of opposing counter rotating rollers, or a combination of stationary and continuous systems.

In other embodiments, compression can be provided by an extrusion, internal mixer or any other equipment that can apply heat, pressure and shear/extensional forces, if necessary.

In other embodiments, a system for recycling a polyurethane mass is provided. The system uses a shredding tool that shreds the polyurethane mass to form shredded pieces or particles. A melt polymer processing tool can produce an article of manufacture from the shredded mass. The shredding tool can feed the shredded pieces or particles into the melt polymer processing tool alone or with the suitable TPU compound, so that the melt polymer processing tool produces the article of manufacture from the shredded pieces or particles alone and/or the suitable TPU compound.

Referring to the drawings and, in particular, to FIG. 1, there is shown a system, generally, designated by the numeral 100, for recycling a polyurethane foam 110. The system 100 includes a grinding tool or a shredding tool 112 and a melt processing tool 114. In this exemplary embodiment, the thermoset polyurethane foam 110 is in the form of a foamed mattress or cushion.

The polyurethane foam 110 can include MDI foams, TDI foams, and/or a mixture of MDI and TDI foams. The polyurethane foam 110 is shredded and further decreased in size that is sufficient to feed the shredded pieces or particles into the melt polymer processing tool 114.

The polyurethane foam 110 can be processed into small foam shreds, fine foam particles, sheet flakes, flakes, spherical-shaped particles, pellets, or irregular-shaped particles by the tool 112. The shredding tool 112 can be configured or aligned to feed the polyurethane mass 110 into the melt processing tool 114 with a TPU thermoplastic elastomer 116.

The TPU thermoplastic elastomer 116 can be any suitable TPU thermoplastic elastomer or thermoplastic polyurethane prepolymers.

The melt processing tool 114 applies heat, pressure and shear to blend the shredded polyurethane masses and the TPU thermoplastic elastomer 116. In some embodiments, additives 118 can be mixed into the blend to enhance the properties thereof. Suitable additives include can include antioxidants, waxes, thermal stabilizers, UV stabilizers, biocides and fillers.

In this exemplary embodiment, the melt processing tool 114 is an extruder. In other embodiments, the melt processing tool 114 can be an internal mixer, an injection molder, or other melt polymer processing tool. In other embodiments, the melt processing tool 114 can include multiple devices, such as an extruder and an injection molder arranged in series, so that the extruder can feed product 120 into the injection molder to form a molded, finished article.

In some embodiments, the product 120 can be an article of manufacture, such as piping, tubing, weather stripping, fencing, deck railings, window frames, and wire insulation wearables, adhesives, synthetic leather, electronic device accessories, shoe parts, such as shoe outsole, insole, uppers, and/or midsole. In other embodiments, the product 120 can be an intermediate product, such as pellets, strands, plastic films, sheeting and/or thermoplastic coatings.

It should be understood that the product 120 can be produced by the melt processing tool 114 without adding catalyst to the polyurethane foam 110 because the polyurethane foam 110 can include residual catalysts due to catalysts that have been added during pre-recycling processing.

Alternatively, additional catalysts can be added as an additive 118. Such catalysts can be selected from zinc-based catalysts, titanium-based catalysts, tin-based catalysts or bismuth-based catalysts.

Figure 2:
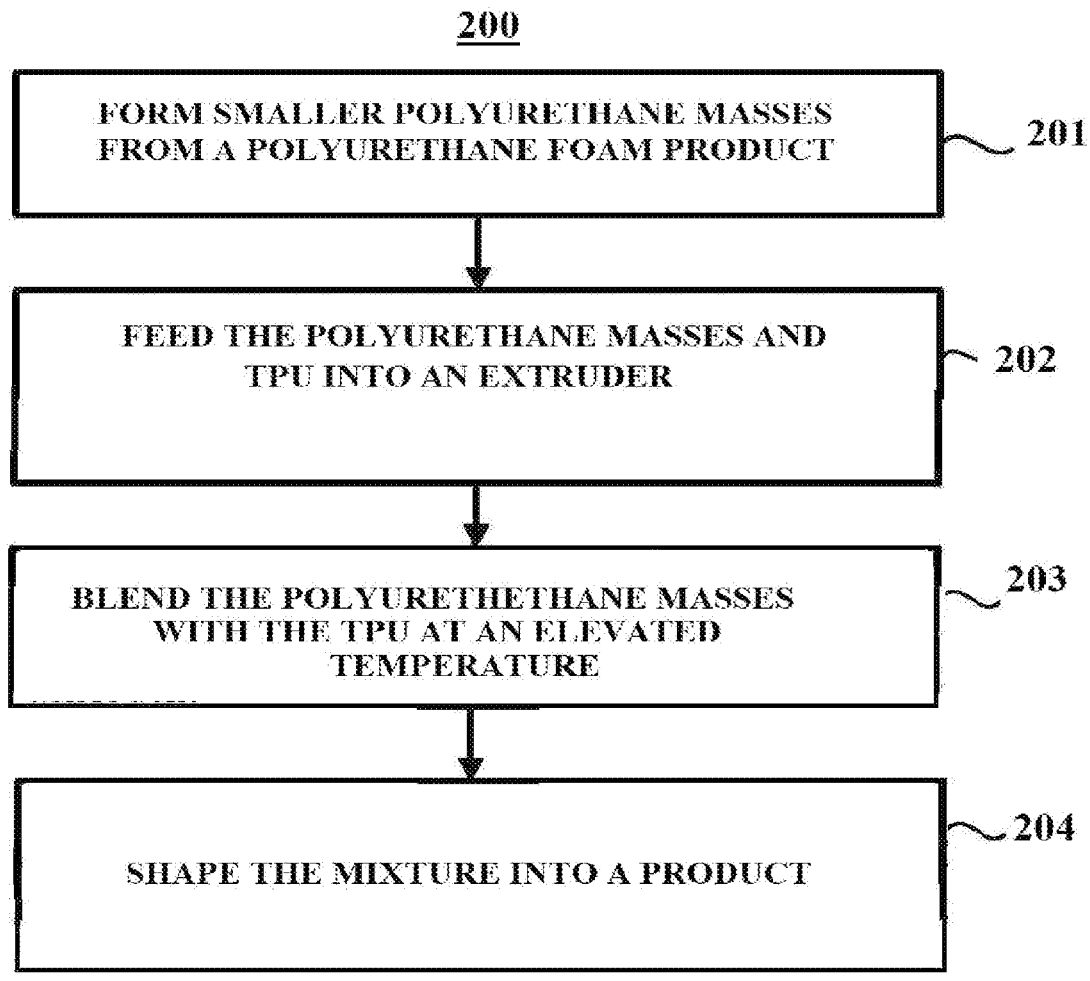
FIG. 2 is an exemplary process in accordance with this disclosure.

Referring to FIG. 2 with continuing reference to the foregoing figure, an exemplary process, generally designated by the numeral 200, for recycling polyurethane foam is shown. The process 200 is a solvent free recycling process that enables the use of recycled foam for a variety of applications, including applications in which the recycled material is in contact with human skin. The process 200 can be implemented with the system 100 shown in FIG. 1.

At 201, smaller foam particles are formed from the polyurethane foam. Step 201 can be accomplished by either one or combination of following methods: Initially shredding the thermoset polyurethane foam mass using commercial large scale shredding tools. Then, the product produced with the shredding tool can be further decreased in size by performing a grinding step at a low temperature (i.e., conventional refrigeration temperatures or cryogenic temperatures) to form a powder.

The initial grinding operations produces pieces or particles. In some embodiments, the particles are less than about 1 mm in diameter. In other embodiments, the particles can be as large as a few inches in size.

At 202, the smaller foam particles or flakes are fed into a melt polymer processing tool, such as an extruder, with a TPU thermoplastic elastomer. At 203, the smaller foam particles or flakes are blended with the TPU thermoplastic elastomer at elevated temperatures to form a blend.

At 204, the melt polymer processing tool cools and shapes the blend to produce product in the form of pellets, articles, sheets, profiles, shredded flakes, shredded pieces. Pellets, shredded flakes, and shredded pieces are produced through subsequent grinding and/or shredding operations, which are sometimes conducted at refrigeration temperatures. Sheets and profiles can be produced through simultaneous compression and heating operations or extrusion/internal mixers.

Figure 3:
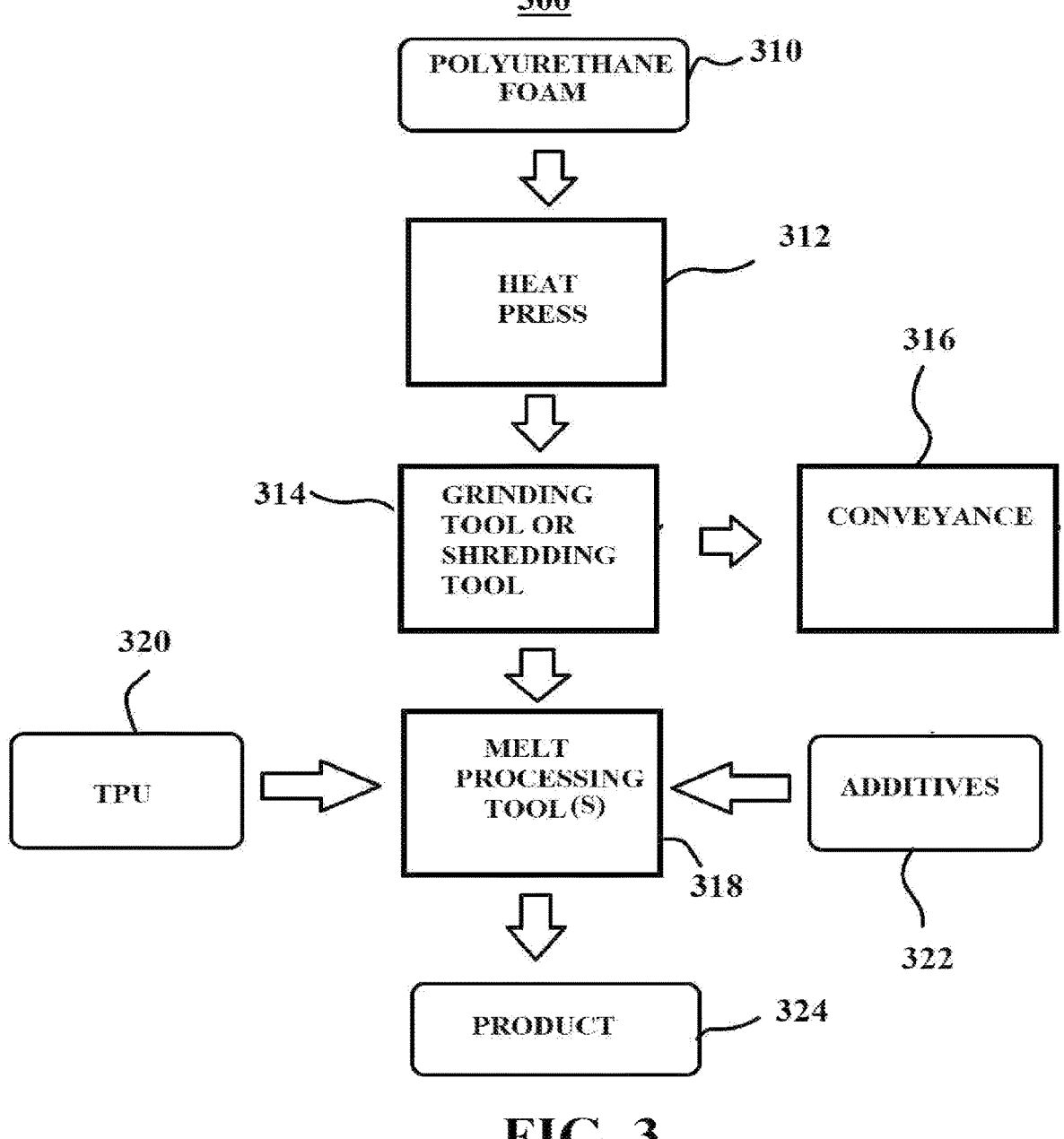
FIG. 3 is a schematic diagram of another embodiment of a system in accordance with this disclosure.

Referring to FIG. 3 with continuing reference to the foregoing figures, there is shown another system, generally, designated by the numeral 300, for recycling a polyurethane foam 310. Unlike the embodiment shown in FIGS. 1-2, the system 300 includes a compression molder or heat press 312 for pre-processing the polyurethane foam 310.

The polyurethane foam 310 can be placed within the heat press 312 in the form of a larger article, such as a whole mattress or larger sized chunks or sections thereof. Alternatively, the polyurethane foam 310 can be subjected to grinding operations or to shredding operations before being placed into the heat press 312.

Once the polyurethane foam 310 is placed in the heat press 312, the polyurethane foam 310 can be subject to elevated temperatures and increased pressures over time. Certain combinations of temperatures and pressures can densify the polyurethane foam 310 and, unexpectedly, can produce vitrimerization within the polyurethane foam 310 within a sufficient period time. In some embodiments, the sufficient period of time can be a period of time at least as long as it takes for vitrimerization and/or densification to occur. Alternatively, a sufficient period of time can be at least about one minute in other embodiments.

The heat press 312 can produce a polyurethane layer structure, such as a sheet or a film. The polyurethane layer structure can be subject to grinding and/or to shredding operations by a grinding or shredding tool 314 to form polyurethane masses in the form of small foam shreds, fine foam particles, sheet flakes, flakes, spherical-shaped particles, pellets, or irregular-shaped particles.

In some embodiments, the polyurethane masses can represent a final product that can be shipped off-site using a conveyance 316. In other embodiments, the polyurethane masses are processed using the melt processing tool 318, the TPU thermoplastic elastomer 320, and the optional additives 322 to form a product 324 in a similar manner as shown in FIGS. 1-2.

Referring to FIG. 4 with continuing reference to the foregoing figures, another exemplary process, generally designated by the numeral 400, for recycling polyurethane foam is shown. Like the embodiments shown in FIGS. 1-2, the process 400 is a solvent free recycling process that enables the use of recycled foam for a variety of applications, including applications in which the recycled material is in contact with human skin. The process 400 can be implemented with the system 300 shown in FIG. 3.

At Steps 401-402, the polyurethane foam is inserted into a heat press and is subjected to increased temperatures and pressures over a predetermined period of time. The heat press forms a polyurethane layer structure in the form of a sheet or a film through compression. The sheet or film can be ground into smaller pieces or shredded at Step 403.

At 404, the smaller pieces are blended with the TPU thermoplastic elastomer at elevated temperatures to form a blend. At 405, the smaller pieces are blended with the TPU thermoplastic elastomer at elevated temperatures to form a blend.

At 406, the melt polymer processing tool cools and shapes the blend to produce product in the form of pellets, articles, sheets, profiles, shredded flakes, shredded pieces. Pellets, shredded flakes, and shredded pieces are produced through subsequent grinding and/or shredding operations, which are sometimes conducted at refrigeration temperatures. Sheets and profiles can be produced through simultaneous compression and heating operations or extrusion/internal mixers.

It should be understood that, in some embodiments, the suitable TPU thermoplastic elastomer compounds can be replaced or mixed with other materials, including thermoplastic polymers, oligomers, catalysts, small chemical molecules, or any combination of aforementioned materials. Exemplary materials include thermoplastic polymers, oligomer, small chemical molecules comprising polyisocyanates, polyols, polyesters, polyurethanes, poly amides, polyesteramides, polythioethers, polycarbonates, polyacetals, polyolefins, polysiloxanes and polyethers. Other exemplary materials include thermoplastic polyurethane, polyisocyanate prepolymers and polyols.

It should further be understood that products produced via the above processes can include recycled content that includes a new polymer backbone that provides excellent mechanical properties and can be used for a variety of applications such as footwear, adhesives, synthetic leather, plastics for wearable electronics, apparel and industrial.

The use of polyurethane (PU) foam as recycled content in thermoplastic polyurethane and other polymers like polycarbonates, polyesters, polyamides, polymethyl methacrylate and so on decreases the carbon footprint of thermoplastic polymers.

SUPPORTED FEATURES AND EMBODIMENTS

The detailed description provided above in connection with the appended drawings explicitly describes and supports various features of methods and systems for recycling polyurethane materials. By way of illustration and not limitation, supported embodiments include a method for recycling a polyurethane foam product comprising: forming the polyurethane foam product into a plurality of polyurethane masses; feeding the plurality of polyurethane masses into an extruder with a thermoplastic polymer urethane thermoplastic elastomer; and blending the plurality of polyurethane masses with the thermoplastic polymer urethane thermoplastic elastomer at an elevated temperature to produce a recycled polyurethane product; wherein the weight ratio of the plurality of polyurethane masses to the thermoplastic polymer urethane thermoplastic elastomer exceeds about 25:75; and wherein the elevated temperature is at least about 180° C.

Supported embodiments include the foregoing method, wherein the forming step includes at least one of grinding the polyurethane foam product and shredding the polyurethane product.

Supported embodiments include any of the foregoing methods, wherein the forming step includes cryogenically grinding the polyurethane foam product.

Supported embodiments include any of the foregoing methods, wherein the forming step includes heating the polyurethane foam product with a heat press under a pressure of at least about 200 psi and a temperature of at least about 180° C. for sufficient time to form a polyurethane layer structure selected from the group consisting of a sheet and a film; and wherein the polyurethane layer structure is converted into the plurality of polyurethane masses.

Supported embodiments include any of the foregoing methods, wherein the polyurethane layer structure is converted into the plurality of polyurethane masses by grinding.

Supported embodiments include any of the foregoing methods, wherein the polyurethane layer structure is converted into the plurality of polyurethane masses by shredding.

Supported embodiments include any of the foregoing methods, wherein the forming step includes densifying the polyurethane foam product.

Supported embodiments include any of the foregoing methods, wherein the forming step includes vitrimerization of the polyurethane foam product.

Supported embodiments include any of the foregoing methods, wherein the plurality of polyurethane masses include at least one of a plurality of polyurethane foam flakes and a plurality of polyurethane foam particles.

Supported embodiments include any of the foregoing methods, wherein the polyurethane foam product includes at least one of a toluene diisocyanate urethane base foam and a methylene diphenyl diisocyanate base foam.

Supported embodiments include any of the foregoing methods, wherein the thermoplastic polymer urethane thermoplastic elastomer is selected from any aromatic or aliphatic thermoplastic polyurethane or their prepolymers.

Supported embodiments include any of the foregoing methods, wherein the polyurethane foam product is a mattress.

Supported embodiments include any of the foregoing methods, wherein the polyurethane foam product includes a catalyst.

Supported embodiments include any of the foregoing methods, further comprising: adding a catalyst during shredding or compression molding or to the extruder during at least one of the feeding step and the blending step.

Supported embodiments include any of the foregoing methods, wherein the catalyst is a urethane catalyst selected from the group consisting of zinc-based catalysts, titanium-based catalysts, tin-based catalysts and bismuth-based catalysts Supported embodiments include any of the foregoing methods, further comprising: adding a polymer processing additive selected from the group consisting of antioxidants, waxes, thermal stabilizers, ultraviolet stabilizers, biocides and fillers to the extruder during the blending step.

Supported embodiments include a method for preparing a polyurethane foam product for transport, the method comprising: heating the polyurethane foam product with a heat press to an elevated temperature of at least about 180° C.; applying an elevated pressure of at least about 200 psi to the polyurethane foam product within the heat press while the polyurethane foam product is at the elevated temperature; holding the polyurethane foam product in the heat press at the elevated pressure and elevated temperature to form a vitrimerized and densified polyurethane layer structure selected from the group consisting of a sheet and a film.

Supported embodiments include the foregoing method, further comprising: converting the polyurethane layer structure into a plurality of polyurethane masses selected from the group consisting of flakes, particles, and pellets.

Supported embodiments include a method for recycling a polyurethane foam product comprising: forming the polyurethane foam product into a plurality of polyurethane masses; feeding the plurality of polyurethane masses into a melt processing tool with a thermoplastic polymer urethane thermoplastic elastomer; and blending the plurality of polyurethane masses with the thermoplastic polymer urethane thermoplastic elastomer at an elevated temperature to produce a recycled polyurethane product; wherein the weight ratio of the plurality of polyurethane masses to the thermoplastic polymer urethane thermoplastic elastomer exceeds about 25:75; and wherein the elevated temperature is at least about 180° C.

Supported embodiments include the foregoing method, wherein the melt processing tool is a melt processing tool selected from the group consisting of an injection molder, a compounder, and an internal mixer.

Supported embodiments include an apparatus, a system, a composition of matter and/or means for implementing any of the foregoing methods for recycling polyurethane foam or portions thereof.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible.

The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

EXAMPLES

Example 1

In Example 1, recycled plastic content in the form of a portion of a TDI based urethane mattress foam was placed in a heat press under a pressure of 300 psi and a temperature of 220° ° C. for five minutes to form a sheet. The sheet was removed from the heat press and was ground at room temperature into small flakes.

The flakes were compounded with Elastollan C 78 A 10 polyester-based thermoplastic polymer urethane 1 (TPU1) thermoplastic elastomer, which was obtained from BASF SE of Ludwigshafen, Germany, inside of an Xplore MC15 micro compounder twin screw extruder, which was obtained from Xplore of Sittard in The Netherlands. The foam flakes and the TPU1 material were added at a weight ratio of 75:25 (Foam flake: TPU1) at an average temperature of 200° C. and a residence time of less than five minutes to form a blend.

Then, the blend was extruded directly into an Xplore IM12 a micro-injection molder, which was obtained from Xplore of Sittard in The Netherlands, to form dog bone-shaped tensile specimens. The dog bone-shaped tensile specimens were visually inspected for uniformity and tested for mechanical properties.

Example 2

In Example 2, tensile specimens were prepared using the process described in Example 1 by compounding recycled plastic content in the form of a TDI based foam flakes with Elastollan 1175A10W thermoplastic polymer urethane 2 (TPU2) thermoplastic elastomer, which was obtained from BASF SE of Ludwigshafen, Germany, at a weight ratio of 50:50.

Example 3

In Example 3, tensile specimens were prepared using the process described in Example 1 by compounding recycled plastic content in the form of TDI based foam flakes with Elastollan C59D53 thermoplastic polymer urethane 3 (TPU3) thermoplastic elastomer, which was obtained from BASF SE of Ludwigshafen, Germany, at a weight ratio of 50:50.

Example 4

In Example 4, tensile specimens were prepared using the process described in Example 1 by compounding recycled plastic content in the form of MDI-based foam with TPU3 thermoplastic elastomer at a weight ratio of 50:50.

Example 5

In Example 5, recycled plastic content in the form of a mixture of MDI based foam and TDI based foam was placed under a heat press at a 50:50 weight ratio. Then, the flakes that were formed from the mixture were compounded with TPU3 at a 50:50 weight ratio for use in the process described in Example 1 to form tensile specimens.

Example 6

In Example 6, tensile specimens were prepared using the process described in Example 1 by compounding recycled plastic content in the form of TDI based foam flakes with TPU 1 at a weight ratio of 50:50. A titanium (IV) 2-ethyl-hexyloxide, 95% titanium-based catalyst was added to the TDI based foam flakes and TPU1 before forming the tensile specimens.

Example 7

In Example 7, recycled plastic content in the form of TDI based foam was cut into pieces. The TDI based foam pieces were added to a cryogrinder to produce fine powder. The TDI based foam fine powder was compounded with TPU1 at a weight ratio 50:50 at a temperature of 180° C. for 15 minutes using the process described in Example 1 to produce tensile specimens.

Examples 8-9

In Examples 8-9, the tensile specimens formed in Examples 1-7 were characterized according to ASTM D638 type I mechanical (tensile) testing standards. Dynamic mechanical analysis (DMA) was performed using a TA Instruments Q800 DMA analytical instrument, which was obtained from TA Instruments of New Castle, Delaware. Glass transition temperatures (Tg) were determined from tan delta curves. Test results are shown in Table 1.

TABLE 1

| | | | Test Results | | | | |
|---|---|---|---|---|---|---|---|
| | Ex. 1 | Ex. 2 | Ex. 3 | Ex. 4 | Ex. 5 | Ex. 6 | Ex. 7 |
| Tensile Strength (Psi) | 2200 | 1100 | 3000 | 1400 | 1580 | 880 | 470 |
| Elongation at break (%) | 480 | 550 | 710 | 390 | 550 | 360 | 130 |
| Tg (DMA-tan delta peak) | −35 | | −39/52 | 22 | −36/38 | | |

Example 10

In Example 10, recycled plastic content in the form of an MDI based foam mattress was placed in a heat press under a pressure of 300 psi at a temperature of 220° C. for five minutes to form a sheet. Then, the resultant sheet was removed from the heat press and ground into small flakes at room temperature. The MDI based flakes were mixed with TPU1 at a weight ratio of 80:20 (MDI based foam flake: TPU) and fed into a GM Gülna twin screw extruder having an with L/D=30/16 for extrusion at a temperature of 200° C. The extruder was obtained from Gülnar Machinery Co. of Istanbul, Turkey. Uniform strands were obtained from the extruder and were pelletized to form pellets.

Example 11

In Example 11, recycled plastic content was formed into pellets using the process described in Example 8 by forming flakes from recycled TDI foam and compounding the flakes with TPU1 at a weight ratio of 50:50.

What is claimed is:

1. A method for recycling a polyurethane foam product comprising:

heating the polyurethane foam product under compression at a temperature of at least about 180° C. and a pressure of at least about 200 psi for a sufficient time without solvent to densify the polyurethane foam product and form a polyurethane layer structure selected from a sheet or a film;

converting the densified polyurethane layer structure into a plurality of polyurethane masses;

feeding the plurality of polyurethane masses into an extruder with a thermoplastic polymer urethane thermoplastic elastomer; and blending the plurality of polyurethane masses with the thermoplastic polymer urethane thermoplastic elastomer at an elevated temperature without solvent to produce a recycled polyurethane product;

wherein the weight ratio of the plurality of polyurethane masses to the thermoplastic polymer urethane thermoplastic elastomer exceeds about 25:75.

2. The method of claim 1, wherein the converting includes at least one of grinding the densified polyurethane layer structure and shredding the densified polyurethane layer structure.

3. The method of claim 2, wherein the converting includes cryogenically grinding the densified polyurethane layer structure.

4. The method of claim 1, wherein the densified polyurethane layer structure is converted into the plurality of polyurethane masses by grinding.

5. The method of claim 1, wherein the densified polyurethane layer structure is converted into the plurality of polyurethane masses by shredding.

6. The method of claim 1, wherein the heating includes vitrimerization of the polyurethane foam product.

7. The method of claim 1, wherein the plurality of polyurethane masses include at least one of a plurality of polyurethane foam flakes and a plurality of polyurethane foam particles.

8. The method of claim 1, wherein the polyurethane foam product includes at least one of a toluene diisocyanate based urethane foam and a methylene diphenyl diisocyanate based foam.

9. The method of claim 1, wherein the thermoplastic polymer urethane thermoplastic elastomer is selected from aliphatic or aromatic thermoplastic polyurethane or their prepolymers.

10. The method of claim 1, wherein the polyurethane foam product is a mattress.

11. The method of claim 1, wherein the polyurethane foam product includes a catalyst.

12. The method of claim 1, further comprising:

adding a catalyst to the extruder during at least one of the feeding and the blending.

13. The method of claim 12 wherein the catalyst is a urethane catalyst selected from the group consisting of zinc-based catalysts, titanium-based catalysts, tin-based catalysts and bismuth-based catalysts.

14. The method of claim 1, further comprising:

adding a polymer processing additive selected from the group consisting of antioxidants, waxes, thermal stabilizers, ultraviolet stabilizers, biocides and fillers to the extruder during the blending.

15. A method for preparing a polyurethane foam product for transport, the method comprising:

heating the polyurethane foam product with a heat press to an elevated temperature of at least about 180° C. without solvent;

applying an elevated pressure of at least about 200 psi to the polyurethane foam product within the heat press while the polyurethane foam product is at the elevated temperature without solvent;

holding the polyurethane foam product in the heat press at the elevated pressure and elevated temperature and sufficient time without solvent to form a vitrimerized and densified polyurethane layer structure selected from the group consisting of a sheet and a film.

16. The method of claim 15, further comprising:

converting the polyurethane layer structure into a plurality of polyurethane masses selected from the group consisting of flakes, particles, and pellets.

17. A method for recycling a polyurethane foam product comprising:

heating the polyurethane foam product under compression at a temperature of at least about 180° C. and a pressure of at least about 200 psi for a sufficient time without solvent to densify the polyurethane foam product and form a polyurethane layer structure selected from a sheet or a film;

converting the densified polyurethane layer structure into a plurality of polyurethane masses;

feeding the plurality of polyurethane masses into a melt processing tool with a thermoplastic polymer urethane thermoplastic elastomer; and blending the plurality of polyurethane masses with the thermoplastic polymer urethane thermoplastic elastomer at an elevated temperature without solvent to produce a recycled polyurethane product;

wherein the weight ratio of the plurality of polyurethane masses to the thermoplastic polymer urethane thermoplastic elastomer exceeds about 50:50.

18. The method of claim 17, wherein the melt processing tool is a melt processing tool selected from the group consisting of an injection molder, a compounder, and an internal mixer.

19. The method of claim 17, wherein converting the densified polyurethane layer structure into the plurality of polyurethane masses comprises cryogenically grinding the polyurethane layer structure to form polyurethane particles.

20. The method of claim 17, further comprising adding at least one polymer processing additive to the melt processing tool during blending, wherein the polymer processing additive is selected from the group consisting of antioxidants, waxes, thermal stabilizers, ultraviolet stabilizers, biocides, and fillers.

* * * * *